United States Patent Office 3,550,992
Patented Dec. 29, 1970

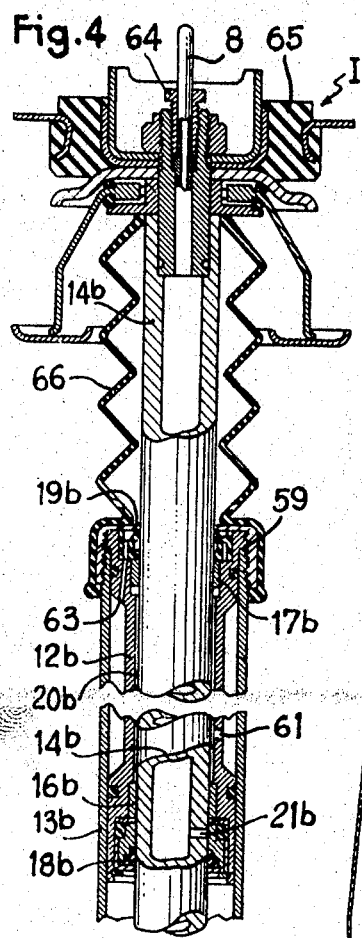
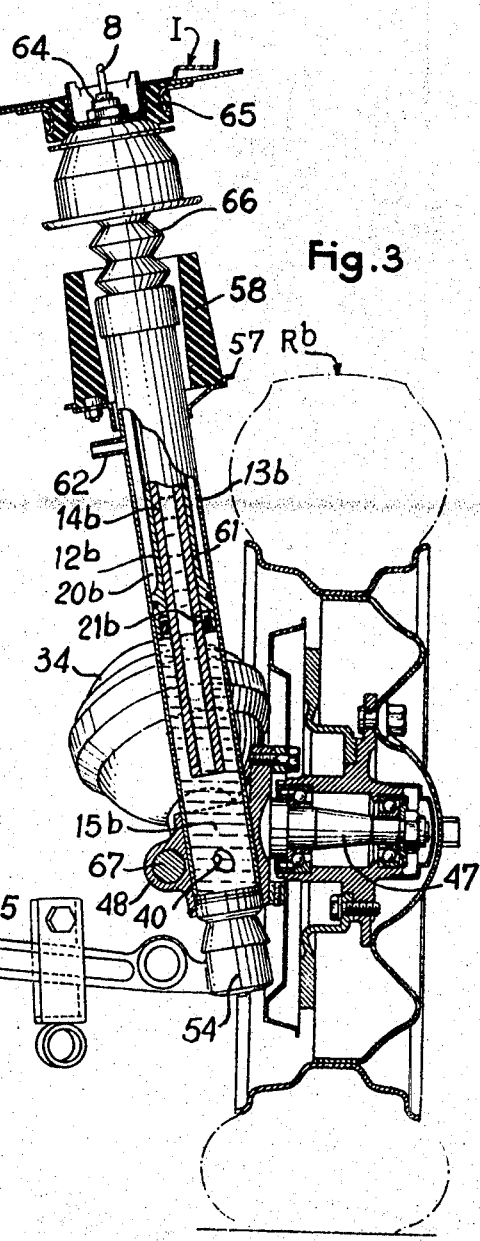
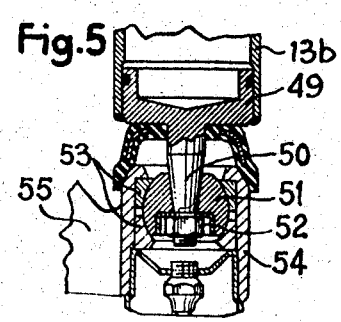

3,550,992
VEHICLE SUSPENSION
Michel Grancon, Marnes-la-Coquette, France, assignor to Automobiles Peugeot, Paris, and Regie Nationale des Usines Renault, Billancourt, France, both French bodies corporate
Filed July 26, 1968, Ser. No. 748,031
Claims priority, application France, Sept. 12, 1967, 120,661
Int. Cl. B60g 17/00
U.S. Cl. 280—6                                          5 Claims

ABSTRACT OF THE DISCLOSURE

A support device in a suspension for an automobile vehicle interposed between the independent wheel and the suspended part of the vehicle. An oil discharge orifice is provided in the hollow piston slidable in the cylinder of the support device for the return of the oil to the oil supply tank when the level of the piston, corresponding to the correct angle of the vehicle, has been reached. This orifice cooperates with a flexible sealing element fixed inside the cylinder.

---

The present invention relates to suspensions of the pneumatic type for automobile vehicles or the like having independent wheels in which each wheel is connected to the suspended part of the vehicle by a support device comprising a cylinder and a piston and a container enclosing a fluidtight enclosure which contains air or other gas, said container communicating through apertures controlled by valves with the chamber defined in the cylinder by the piston, a displacement pump permanently supplying oil to said space.

In such an arrangement, the air constitutes an elastically yieldable cushion which renders the suspension elastic; the liquid continuously supplied by the pump to the chamber defined by the piston in the cylinder transmits to the cushion of air the force due to the weight of the suspended part of the vehicle which bears on the considered support devices; the valves located between the cylinder and the enclosure containing the gas constitute the damping device.

In suspensions of this type, and in particular in those described in French Pats. 1,228,272 and 1,293,578, the angle of the vehicle is automatically maintained by means of an orifice provided in the cylinder of the support device through which the oil delivered by the pump is discharged to the oil tank when this orifice is uncovered by the piston.

Further, in the various known devices, it is usual to include an anti-roll connection between the two independent wheels of the same set of wheels by means of an anti-roll bar and intercommunication between the oil chambers of the two support devices, diaphragms having a calibrated orifice being provided in this intercommunication.

The object of this invention is to provide an improved suspension of the aforementoined type having a permanently operating displacement pump which is of simpler construction, at least as concerns the angle correcting device.

In this improved suspension, each support device having a cylinder and piston comprises, for the return of the oil to the tank when the height corresponding to the correct angle is reached, a discharge orifice in the wall of the piston, which is hollow, this orifice co-operating with a flexible sealing element secured inside the cylinder.

With this arrangement of the sealing element relative to the discharge orifice, when the movable discharge orifice passes in front of the sealing element, oil under pressure which passes through said orifice temporarily urges back, in front of the oil, the lips of the element so that there is never contact between the element and the edge of the orifice. Thus it is possible to stabilize the suspended part of the vehicle substantially at the same level, whether the engine is running or not, contrary to what occurs with known devices of the type having a discharge orifice formed in the cylinder in which the position of the suspended part with the engine stopped is usually lower than the position corresponding to a running engine owing to the fact that it is almost impossible to move the sealing element in front of the fixed orifice without resulting in a rapid destruction of this element, which the pressure of the oil contained in the cylinder flattens against the edge of the orifice.

Further features and advantages of the invention will be apparent from the ensuing description with reference to the accompanying drawings.

In the drawings:

FIG. 3 is a vertical sectional view of one of the two support devices pertaining to the front steering wheels;

FIG. 4 is a partial vertical sectional view of the same device on an enlarged scale, and FIG. 5 is a similar view showing the pivotal connection of the lower end of the cylinder of the support device to the conventional lower arm of the front suspension.

Figure 1:
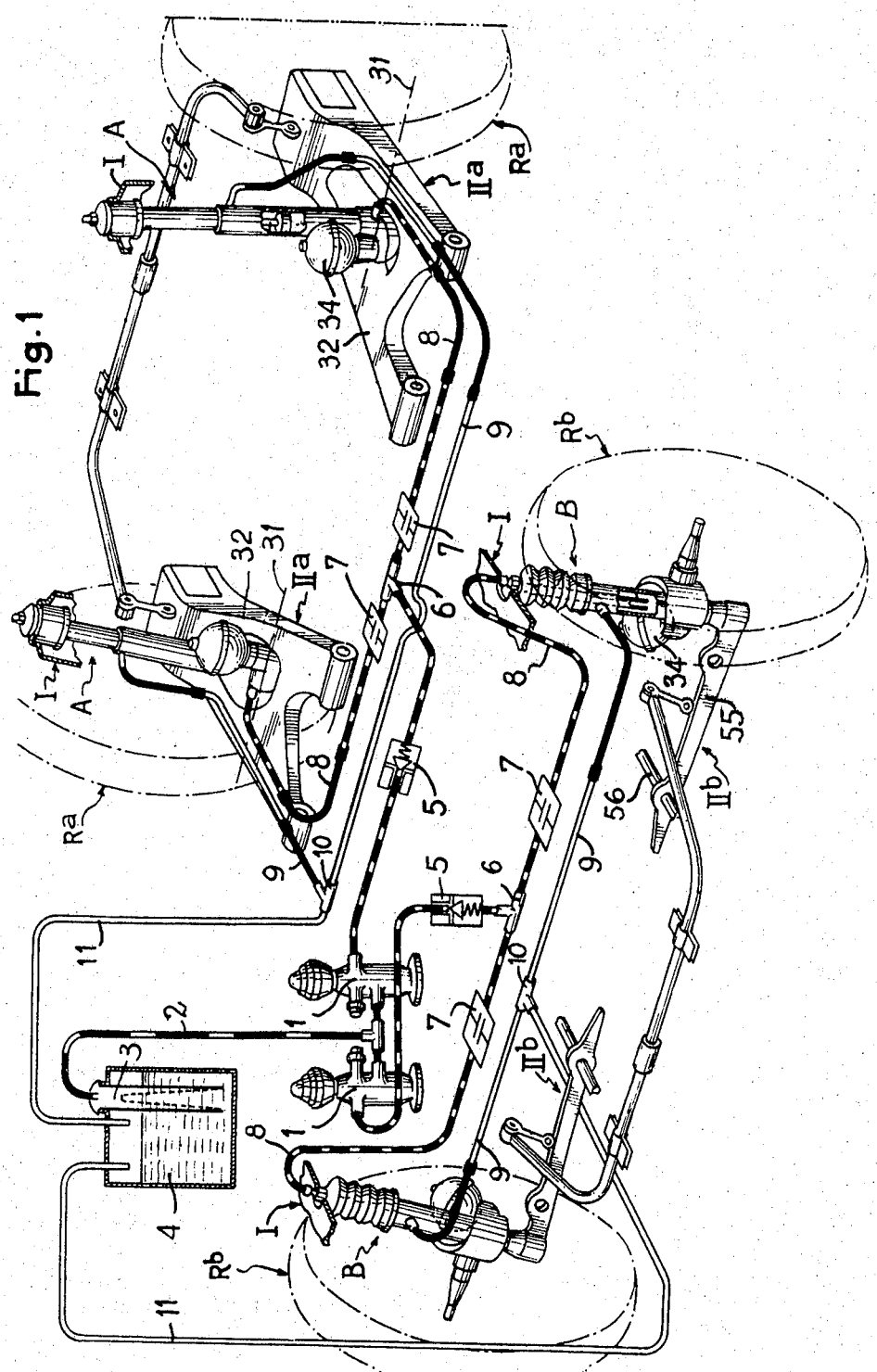
FIG. 1 is a diagrammatic perspective view of the assembly of the improved indenpendent wheel suspension of an automobile vehicle, this suspension concerning the two front wheel units and the two rear wheel units.

Reference will first be made to FIG. 1 in which the conduit having long dashed lines corresponds to the suction circuit of the pumps, the conduits having short dashed lines contain oil under pressure, the conduits shown as two thin lines correspond to the discharge circuits and the conduits in solid black are flexible conduits.

FIG. 1 shows the invention applied to a vehicle having four independent wheels, namely two rear carrying wheels $R^a$ and two front steering wheels $R^b$. Each of these wheels is connected to the suspended part of the vehicle (diagrammatically shown in FIG. 1 by small portions of the body):

by one of the two independent parts $II^a$ of the rear set of wheels or $II^b$ of the front set of wheels;

and by one of the two pneumatic suspension support devices, namely the rear device A or the front device B.

A pump 1 is provided for each of wheels. The pumps are driven by the engine and their output or delivery rate is constant beyond a certain speed of the engine. They draw in oil by way of the common conduit 2, through a filter 3, from an oil tank 4. Each one of them delivers oil under pressure through a check valve 5 to a three-way coupling 6. From the latter the oil is conveyed through two diaphragms 7 provided with a calibrated orifice and through conduits 8 to the support devices A or B so that each pump 1 feeds the two front or rear devices continuously and in parallel.

The oil is returned to the tank by way of the conduits 9, three-way couplings 10 and conduits 11.

Figure 2:
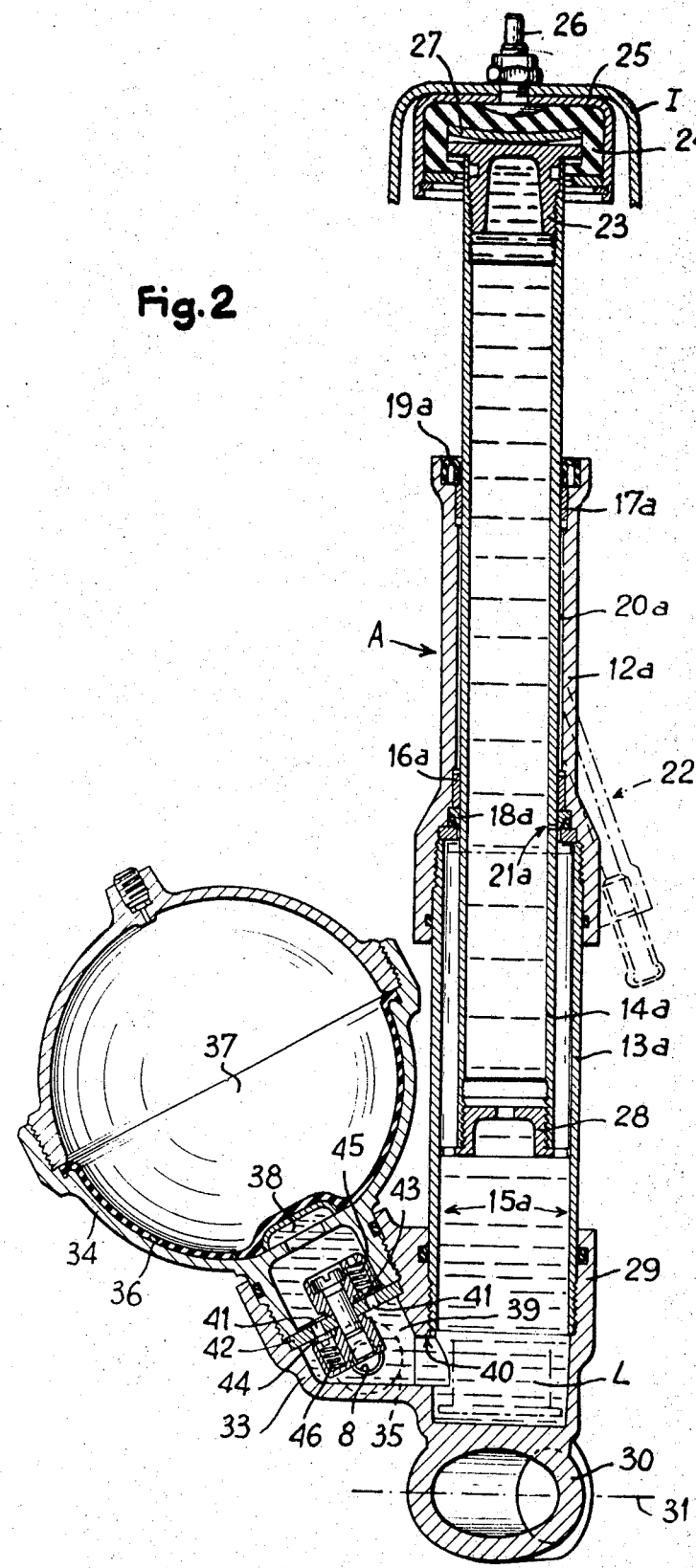
FIG. 2 is a veritcal sectional view of one of the two support devices pertaining to the rear set of wheels.

Each of the rear support devices A (FIG. 2) comprises a body or cylinder $12^a$ with which is screwthreadedly engaged a case-tube $13^a$. Slidable inside these two cylindrical parts is a hollow piston $14^a$ which has a constant section and defines a chamber $15^a$ of variable volume. The piston is guided in its reciprocating motion by two bearings disposed in the cylinder $12^a$, each bearing comprising a bushing $16^a$ or $17^a$ of an anti-friction material and a fluidtight sealing element $18^a$ or $19^a$. Consequently, the small annular space $20^a$ defined by the piston 14$^a$, the cylinder 12$^a$ and the sealing elements 18$^a$ and 19$^a$ has a constant volume in the course of the movements.

Formed in the wall of the hollow piston 14$^a$ is an orifice 21$^a$ which, depending on the movements of the suspended part of the vehicle, is above, in alignment with, or under, the sealing element 18$^a$. An outlet connection 22 is formed in the body on cylinder 12$^a$ between the sealing elements 18$^a$ and 19$^a$ for returning the oil to the tank by way of the circuit 9, 10, 11. This circuit is made as short as possible so that the sealing element 19$^a$ never operates under pressure.

The piston terminates in its upper part in a closing plug 23 and the suspended part I of the vehicle is secured thereto, with the interposition of two blocks of rubber or other elastomer 24 maintained in a metal housing 25 fixed to the suspended part I by a bolt 26. The vertical force corresponding to the weight supported, is transmitted to the plug 23 through a plate 27 having a spherical dome shape. Such a connection allows small axial and angular movements.

The piston 14$^a$ terminates in its lower part in a plug 28 having a notched flange and an aperture large enough not to retard the passage of the oil, the chamber 15$^a$ defined in the case-tube 13$^a$ therefore comprising the whole of the space provided in this case and in the hollow of the piston. The only function of this plug 28 is to act as an upper or lower safety abutment in the even that the normal abutments limiting the up and down movements of the body are impaired.

The lower part of this case-tube 13$^a$ is screwthreadedly engaged with a base 29 having an eye 30 for the passage of a journal represented in the drawings by its axis 31 (FIG. 1) about which the support device A is pivotable on the suspension arm 32.

The base 29 also comprises a first connection 33, to which is fixed a rigid container 34 having a part-spherical shape, and a second connection 35 to which is connected the conduit 8 through which the oil under pressure flows to the chamber 15$^a$.

The spherical container 34 is provided, in the known manner, by a deformable membrane 36 which defines therein a closed and fluidtight enclosure 37 and a cavity 38.

The enclosure 37 is full of air or other gas whereas the cavity 38 is extended in the connection 33 by another cavity 39 which communicates with the chamber 15$^a$ in the corresponding cylinder by way of an aperture 40.

The two cavities 38 and 39 intercommunicate in the known manner by way of apertures 41 formed in a seat 42 against which valves 43 and 44, located on opposite sides of the seat, are biased by springs 45 and 46 so that a part of the oil or other liquid which fills the chamber 15$^a$ and cavity 39 can flow into the cavity 38 and viceversa but accompanied by a lamination due to the necessity of raising the valves 43 or the valves 44. This damps the suspension whose elasticity is ensured by the compression or expansion of the air filling the enclosure 37.

With reference now to FIGS. 4–6, pertaining to one of the front wheel units, the cylinder 12$^b$, the case-tube 13$^b$ and the hollow constant-section piston 14$^b$ which defines a chamber 15$^b$ of variable volume are once again shown.

The wheel R$^b$ is freely rotatable on the stub-axle 47 integral with a base 48 with which is screwthreadedly engaged or tightly fitted the lower end of the case-tube 13$^b$.

Attached in the lower end of this case-tube 13$^b$ (FIG. 5) is an end member 49 which comprises an axial extension 50 on which is fitted a ball 51 held in position by a nut 52. The ball is rotatable in two cups 53 disposed in the end 54 of the lower suspension arm 55, this arm being pivotably connected to the suspended part I of the vehicle by a longitudinal pin 56.

Connected to the upper part of the case-tube 13$^b$ (FIGS. 3 and 4) is a flange 57 supporting a member 58 of elastomer which acts as a bottoming element for the suspended part I. The end of this case-tube 13$^b$ bears against a shoulder 59 on the cylinder on body 12$^b$.

Slidable in this cylinder 12$^b$ with a slight clearance is the hollow piston 14$^b$ which is guided by two bearings each of which comprises a bushing 16$^b$ and 17$^b$ of antifriction material and a sealing element 18$^b$ and 19$^b$ which define an annular space 20$^b$ as in the rear support element.

Formed in the wall of the hollow piston 14$^b$ is an orifice 21$^b$ which, depending on the movements of the suspended part of the vehicle, is above, in alignment with, or below the sealing element 18$^b$.

The return of oil to the tank from the annular space 20$^b$ is by way of an aperture 61 in the cylinder 12$^b$, an outlet connection 52 placed on the case-tube 13$^b$, and the circuit 9, 10, 11.

Possible leakages of oil between the sealing element 19$^b$ and the piston 14$^b$ are returned to the circuit by way of an aperture 63 formed in the upper part of the cylinder 12$^b$.

The upper part of the piston 14$^b$ comprises an end member 64 to which is connected the conduit 8 supplying oil under pressure to the support element B.

The piston 14$^b$ is fixed to the suspended part I of the vehicle by an elastomer member 65 and is protected above the cylinder 12$^b$ by a bellows 66.

As for the rear support device A, a fluidtight container is connected to the base 48 and is in communication with the chamber 15$^b$ by way of the aperture 40. It is unnecessary to repeat the function of this container which has already been described with reference to the rear support device A.

The base 48 receives the pin 67 of the steering lever.

The equilibrium of the suspension will now be examined when stationary and in motion.

After a stoppage of the vehicle of long duration, the suspended part is in the lower position. Starting up the motor will cause operation of the pumps 1 which pump oil under pressure to the chambers 15$^a$ and 15$^b$ of the support devices. The pressure first compresses the gas in the containers 34 and then shift these pistons and the suspended part I of the vehicle upwardly until the orifices 21$^a$ and 21$^b$ respectively pass above the sealing elements 18$^a$ and 18$^b$. There is then a communication between the chambers 15$^a$ and 15$^b$ and the tank 4 and the angle of the vehicle is stabilized in a position in which the orifices 21$^a$ and 21$^b$ are uncovered sufficiently to allow the return to the tank of all the oil arriving in the chambers 15$^a$ and 15$^b$ while creating a pressure drop which is such that the pressure in said chambers is sufficient to balance the weight of the suspended part.

The arrangement adopted is such that when the orifice 21$^a$ or 21$^b$ is in front of the corresponding sealing element 18$^a$ or 18$^b$, the arrival of oil under pressure temporarily and locally urges back this element so that there is never contact between the latter and the edge of the orifice.

In operation, if the body descends and thus shifts the piston downwardly, the orifice 21$^a$ or 21$^b$ passes again below the sealing element and cuts off the communication with the tank so that the oil arriving in chamber 15$^a$ or 15$^b$ increases the pressure of the gas in the containers 34 and raises the piston and the suspended part which resumes its normal level.

When the body has a tendency to rise the discharge orifice passes completely above the sealing element and reduces the pressure drop. A larger amount of oil returns to the tank, the pressure drops and the suspended part of the vehicle resumes its normal level.

It will be observed that, in respect of each support device A or B, the body of the piston 14$^a$ or 14$^b$ of constant section slides in two bearings 17ª, 18ª, 17ᵇ, 18ᵇ which constitute seals and are disposed in the cylinder 12ª or 12ᵇ. Consequently the small annular space 20ª or 20ᵇ defined by the piston, the cylinder and the two bearings constituting seals, has a constant volume during the movements of the piston and this avoids any risk of blocking of the device, as could otherwise be the case when the piston forms, for example by a shoulder between a piston head and a piston rod, a movable end for the annular space between the cylinder and the piston rod, this space then varying in volume, which requires large inlet and outlet flows of the liquid and consequently conduits of large section which take up a large amount of space.

It is also to be noted that the intercommunication between the two support devices of the same set of wheels, by way of the conduits 8 and the calibrated orifices 7, affords an anti-roll correction which is added to the action of the torsion bar, as described in the aforementioned Pat. 1,293,578.

When the engine and consequently the pumps are stopped, the pistons move slightly downwardly until the discharge orifice 21ª or 21ᵇ is immediately below the sealing element 18ª or 18ᵇ. The latter prevents any return of the oil to the tank and it is clear that the suspended part of the vehicle remains at a level which is only a few millimetres lower than the stabilized level with the engine running. It is obvious that, in respect of stoppage of several days, the minute leakages would result in a gradual sinking of the assembly until the next starting up of the engine.

Although specific embodiments of the invention have been described, many modifications and changes may be made therein without departing from the scope of the invention.

Having now described my invention, what I claim as new and desire to secure by Letters Patent is:

1. In a suspension for an automobile vehicle or the like having independent wheels, said suspension being of the type in which each wheel is connected to the suspended part of the vehicle by a support device comprising a cylinder, a piston slidably mounted in said cylinder and defining therein a chamber, a container enclosing a fluidtight enclosure which contains gas, said container communicating through apertures controlled by valves with said chamber defined in the cylinder by the piston, an oil tank, a displacement pump permanently supplying oil to said chamber from said tank; the feature that the piston of each support device is hollow, the support device comprising for the return of the oil to said tank when the height corresponding to the correct angle of the vehicle is reached, a discharge orifice in the wall of the piston and a flexible sealing element secured inside the cylinder and with which said discharge orifice is cooperable, said flexible sealing element having a flexible cylindrical inner wall engaging said piston, whereby when said discharge orifice is in front of said flexible inner wall, the flow of oil under pressure urges back said flexible inner wall, thus avoiding any contact between said flexible inner wall and the edge of the orifice.

2. A suspension as claimed in claim 1, wherein each support device comprises an end element and said suspended part of the vehicle comprises an element engaged with said end element of the support device, one of said elements having a substantially part-spherical face engaged with the other element whereby said support device is free to undergo small angular movements relative to said suspended part.

3. In a suspension for an automobile vehicle or the like having independent wheels, said suspension being of the type in which each wheel is connected to the suspended part of the vehicle by a support device comprising a cylinder, a piston slidably mounted in said cylinder and defining therein a chamber, a container enclosing a fluidtight enclosure which contains gas, said container communicating through apertures controlled by valves with said chamber defined in the cylinder by the piston, an oil tank, a displacement pump permanently supplying oil to said chamber from said tank; the feature that the piston of each support device is hollow, the support device comprising for the return of the oil to said tank when the height corresponding to the correct angle of the vehicle is reached, a discharge orifice in the wall of the piston and a flexible sealing element secured inside the cylinder and with which said discharge orifice is cooperable, said support device comprising two fixed bearings disposed in said cylinder and having sealing elements, one of which sealing elements is cooperable with said discharge orifice, said piston being slidable in said bearings, the body of the piston, the cylinder and said bearings defining a free space having a small radial extent and a constant volume notwithstanding the movements of the piston in the cylinder.

4. A suspension as claimed in claim 3, wherein said flexible sealing element has a flexible cylindrical inner wall engaging said piston, whereby when said discharge orifice is in front of said flexible inner wall, the flow of oil under pressure urges back said flexible inner wall, thus avoiding any contact between said flexible inner wall and the edge of the orifice.

5. A suspension as claimed in claim 3, wherein each support device comprises an end element and said suspended part of the vehicle comprises an element engaged with said end element of the support device, one of said elements having a substantially part-spherical face engaged with the other element whereby said support device is free to undergo small angular movements relative to said suspended part.

References Cited
UNITED STATES PATENTS

| | | | |
|---|---|---|---|
| 3,036,844 | 5/1962 | Vogel | 280—124F |
| 3,149,830 | 9/1964 | Broadwell | 280—124F |

PHILIP GOODMAN, Primary Examiner

U.S. Cl. X.R.

280—124